(12) United States Patent
Liebowitz

(10) Patent No.: US 6,928,870 B1
(45) Date of Patent: Aug. 16, 2005

(54) SPICE STORAGE AND DISPENSING SPOON

(75) Inventor: Marc Liebowitz, Syosset, NY (US)

(73) Assignee: Lapform Products, Inc., Planview, NY (US)

( * ) Notice: Subject to any disclaimer, the term of this patent is extended or adjusted under 35 U.S.C. 154(b) by 0 days.

(21) Appl. No.: 10/848,087

(22) Filed: May 18, 2004

(51) Int. Cl.$^7$ .............................................. G01F 19/00
(52) U.S. Cl. ..................... 73/426; 73/427; 222/191; 222/192; D10/46.2; D10/46.3
(58) Field of Search .................. 73/49, 426–429; 222/191, 192; D10/46.2, 46.3

(56) References Cited

U.S. PATENT DOCUMENTS

| | | | |
|---|---|---|---|
| 160,852 A * | 3/1875 | Thayer ...................... 220/502 |
| 353,055 A | 11/1886 | Door | |
| 380,724 A | 4/1888 | Langguth | |
| 423,018 A | 3/1890 | Young | |
| 662,588 A | 11/1900 | Bloom | |
| 847,942 A * | 3/1907 | Hohein ........................ 30/326 |
| 1,000,178 A * | 8/1911 | Kahl ......................... 30/123.3 |
| 1,250,890 A | 12/1917 | Johnson | |
| 2,165,642 A * | 7/1939 | Mayer ........................ 73/429 |
| 2,252,119 A * | 8/1941 | Edmonds ................... 30/123.3 |
| 2,453,525 A | 11/1948 | McNeil | |
| 2,698,996 A | 1/1955 | Hickerson | |
| 2,795,043 A | 6/1957 | Fleischer | |
| 3,116,152 A * | 12/1963 | Smith ........................ 426/115 |
| 3,133,679 A * | 5/1964 | Brown ....................... 222/205 |
| 3,154,418 A * | 10/1964 | Lovell et al. ................. 426/78 |
| 3,473,221 A | 10/1969 | Flanders | |
| 3,612,358 A | 10/1971 | Massa | |
| 3,911,578 A * | 10/1975 | Ushkow et al. ............... 30/326 |
| 3,931,741 A | 1/1976 | Ceccarelli | |
| 4,724,615 A * | 2/1988 | Mackles et al. ............... 30/326 |
| 4,830,222 A * | 5/1989 | Read ........................... 222/106 |
| 4,880,409 A | 11/1989 | Winblad et al. | |
| 4,888,188 A | 12/1989 | Castner, Sr. et al. | |
| 4,957,226 A * | 9/1990 | Pacia ......................... 222/643 |
| 5,038,974 A * | 8/1991 | DaCosta ..................... 222/106 |
| 5,119,560 A | 6/1992 | Noble | |
| 5,154,318 A * | 10/1992 | Lampard .................... 222/105 |
| 5,305,928 A | 4/1994 | Verdaguer | |
| 5,377,879 A | 1/1995 | Isaacs | |
| 5,491,895 A | 2/1996 | Lee | |
| D371,491 S * | 7/1996 | Stein ......................... D7/643 |
| 5,671,875 A | 9/1997 | Robbins, III et al. | |
| 5,850,944 A | 12/1998 | Robbins, III et al. | |
| 5,894,975 A | 4/1999 | Robbins, III et al. | |
| 6,279,233 B1 | 8/2001 | Cameron | |
| 6,283,339 B1 | 9/2001 | Morrow | |
| 6,295,735 B1 | 10/2001 | Barger | |
| 6,347,727 B1 | 2/2002 | Diaz | |
| 6,399,079 B1 | 6/2002 | Mehta et al. | |
| 6,422,426 B1 | 7/2002 | Robbins, III et al. | |
| 6,550,640 B2 | 4/2003 | Smith | |
| 6,601,734 B1 | 8/2003 | Smith | |
| 6,662,972 B2 | 12/2003 | Chu | |
| 6,675,482 B1 | 1/2004 | Gilbert, Jr. et al. | |
| 2002/0104856 A1 | 8/2002 | Clark, Jr. et al. | |
| 2002/0158852 A1 | 10/2002 | Schultz | |
| 2004/0006874 A1 | 1/2004 | Kamm et al. | |

* cited by examiner

Primary Examiner—Hezron Williams
Assistant Examiner—David A. Rogres
(74) Attorney, Agent, or Firm—Amster, Rothstein & Ebenstein

(57) ABSTRACT

A spice storage and dispensing system is configured as a spoon and includes a handle for the storage of spice and a bowl for the measurement and dispensing of spice received from the handle.

3 Claims, 2 Drawing Sheets

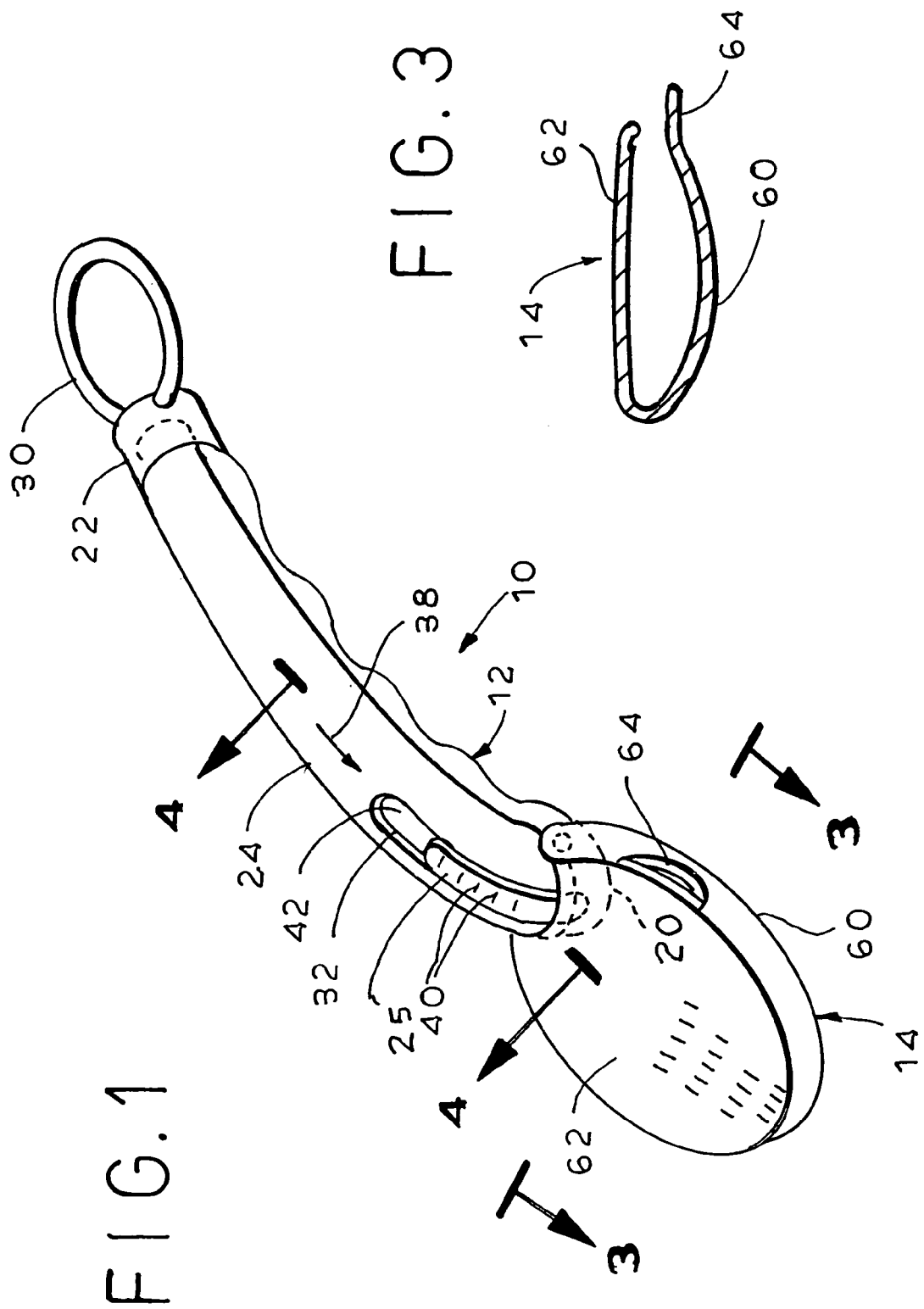

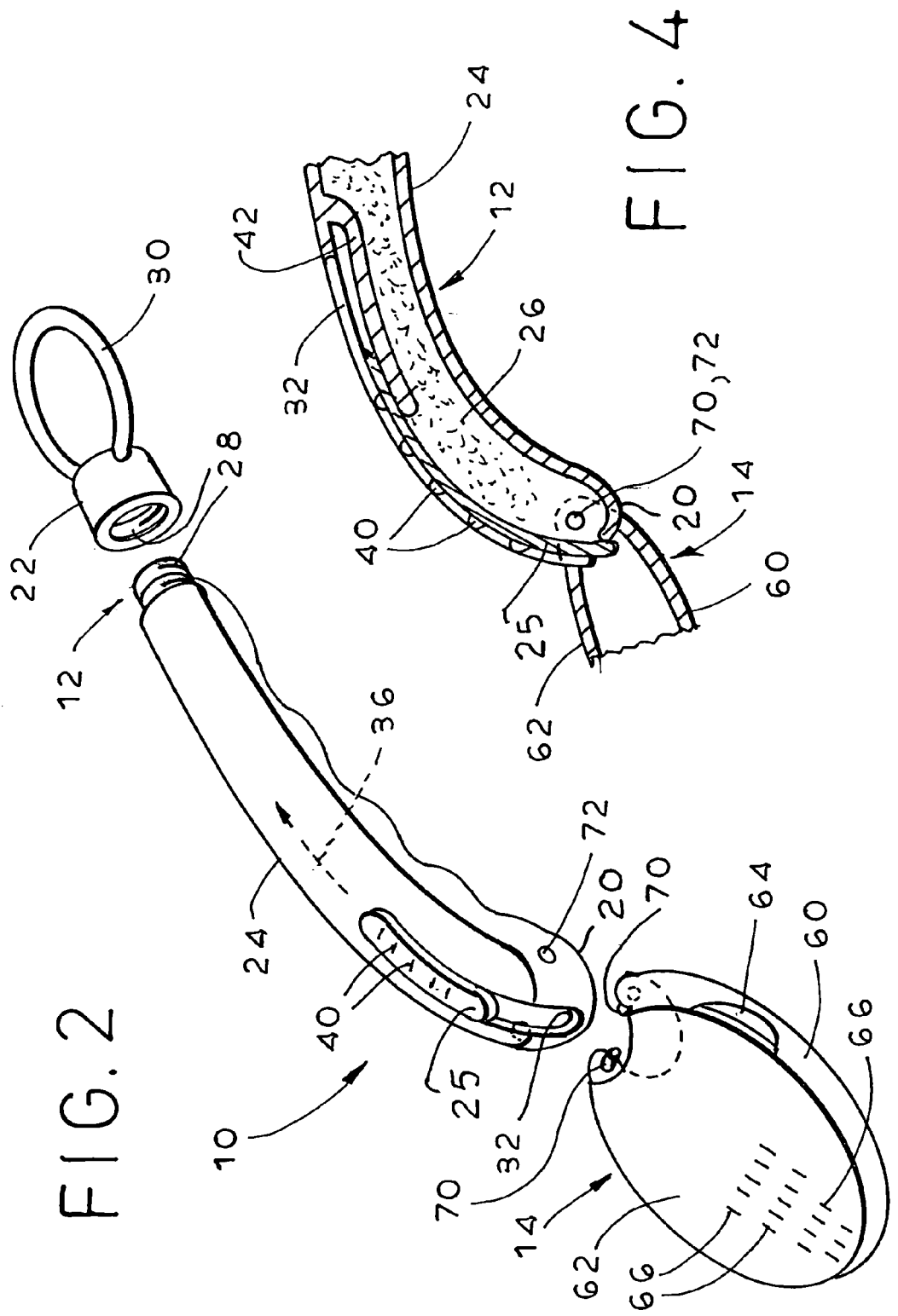

SPICE STORAGE AND DISPENSING SPOON

BACKGROUND OF THE INVENTION

The present invention relates to a spice storage and dispensing system capable of dispensing various quantities of a spice, as called for by a recipe, and in particular such a system which is configured as a spoon.

Liquid and granulated or powdered solid spices are typically purchased in a container (such as a spice bottle or plastic tin) containing more of the spice than is actually required by a given recipe for individual or family use. Typically spice containers are stored in proximity to one another, for example as bottles on a spice rack. In order to measure out from a given spice container the appropriate amount of spice for a given recipe, a separate kitchen utensil, commonly referred to as a "measuring spoon," is used. Measuring spoons come in various sizes, typically ranging from $\frac{1}{8}^{th}$ of a teaspoon to 1 tablespoon, with several different size measuring spoons frequently being secured together as a unit.

Such a system separates the storage and dispensing (measuring) functions, requiring the user to locate both the spice container and the appropriate measuring spoon (as called for by a given recipe). Where the same quantity of different spices will be used, good kitchen practice requires cleaning of the measuring spoon between uses, as well as after the last use and prior to storage. Where different quantities of the same spice will be used, good kitchen practice requires cleaning of the different measuring spoons as well.

Accordingly, it is an object of the present invention to provide, in a preferred embodiment, a spice storage and dispensing system wherein both the storage and dispensing functions are performed by a single device configured as a spoon.

Another object is to provide such a system wherein, a preferred embodiment, a system is dedicated to a particular spice so that washing of the system between uses may be minimized.

A further object is to provide such a system which is inexpensive, simple and easy to manufacture, use and maintain.

SUMMARY OF THE INVENTION

It has now been found that the above and related objects of the present invention are obtained in a spice storage and dispensing system configured as a spoon and comprising a handle and a bowl. The handle and bowl cooperatively define means for securing the handle and the bowl together in the spoon configuration.

The handle has an open front end, a rear end, a hollow body connecting the ends, and a door. The body is configured and dimensioned to receive and store spice therein. The rear end is manually movable between an open orientation enabling passage of spice into the body and a closed orientation precluding passage of spice out of the body therethrough. The front end provides communication for spice between the body and the bowl. The door is manually moveable between an open orientation enabling passage of spice from the body through the front end into the bowl and a closed orientation precluding passage of spice from the body through the front end into the bowl.

The bowl has a receptacle, a transparent cover for the receptacle, and a spout. The receptacle has an open top and is in communication with the body to receive spice therefrom through the front end only when the door is in the open orientation. The transparent cover precludes spice from passing out of the receptacle through the open top thereof and bears indicia indicating the volumetric level of spice in the bowl when the bowl is vertically oriented downward. The spout is disposed above the indicia and enables passage of spice from the receptacle out of the bowl only when the bowl is appropriately oriented.

In a preferred embodiment the spout is disposed on one side of the bowl and the appropriate orientation for passage of spice out of the bowl is with that one side downward. Optionally the rear end in the open orientation is removed from the body and in the closed orientation is secured to the body.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 1 is an exploded isometric view of the spice storage and dispensing system configured as a spoon;

FIG. 2 is an assembly isometric view thereof;

FIG. 3 is a fragmentary sectional view taken along the line 3—3 of FIG. 2; and

FIG. 4 is a fragmentary sectional view taken along the line 4—4 of FIG. 2.

DETAILED DESCRIPTION OF THE PREFERRED EMBODIMENTS

Referring now to the drawing, and in particular to FIG. 1 thereof, therein illustrated is a spice storage and dispensing system configured as a spoon according to the present invention and generally designated by the reference numeral 10. The spoon 10 comprises a handle, generally designated 12, and a bowl, generally designated 14. As will be described in detail hereinbelow, the handle 12 and the bowl 14 cooperatively define means for securing the handle 12 and the bowl 14 together in the spoon configuration.

Referring now to FIGS. 2 and 4 as well, the handle 12 has an open front end 20, a rear end 22, a hollow body 24 connecting the ends 20, 22 and a door 25. More particularly, the hollow body 24 is configured and dimensioned to receive and store a spice 26 therein (as best seen in FIG. 4). The external configuration and dimensions of the body 24 are preferably selected for suitability for grasping by a user's hand and may be ridged or contoured for comfort and security.

The rear end 22 of handle 12 is manually movable between an open orientation enabling passage of spice 26 into the body 24 and a closed orientation precluding passage of spice 26 out of the body 24 therethrough. Thus, the rear end 22 in the closed orientation is secured to the body 24, as illustrated in FIG. 1, and in the open configuration is removed or spaced from the body 24, as illustrated in FIG. 2. To prevent accidental separation of the rear end 22 from the body 24, the two are preferably threadedly engageable as indicated by the threads 28 illustrated in FIG. 2. Preferably the rear end 22 includes a rigid ring or flexible loop 30 secured thereto so that, when the rear end 22 is in the closed orientation, the spoon 10 can easily and conveniently be mounted on a hook (not shown), preferably alongside a plurality of like spoons 10, each holding a different spice 26, as is often done with ladles.

The front end 20 of handle 12 provides an open raceway 32 affording communication for spice 26 between the interior of the body 24 and the interior of bowl 14.

The door 25 of handle 12 is manually movable along raceway 32 between an open orientation enabling passage of spice 26 from the body 24 through the open front end 20 into the bowl 14, as illustrated in FIG. 2, and a closed orientation, precluding such passage of spice 26 into the bowl 14, as illustrated in FIG. 1. The door 25 is preferably flexible and capable of riding rearwardly (as illustrated by the arrow 36 in FIG. 2) to open the passageway and forwardly (as illustrated by the arrow 38 in FIG. 1) to close the passageway. To facilitate movement of the door 25 back and forth relative to front end 20, the outer surface thereof is preferably knurled, as indicated by the ridges 40. As best seen in FIG. 4, an interior wall 42 is disposed within body 26, immediately below the rear portion of the raceway 32, thereby to preclude the passage of spice 26 out of the handle 24 through the front end 20 when the door 25 is in the closed orientation.

It will be appreciated by those skilled in the art that, when both the rear end 22 and the front end 20 are in their respective closed orientations, the spice 26 within the hollow body 24 is in a closed environment suitable for prolonged storage of the spice 26 therein.

Referring now to FIG. 3 as well, the bowl 14 has a receptacle 60, a transparent cover 62 for the receptacle 60 and a spout 64. The bowl receptacle 60 has an open top (like the bowl of a conventional spoon) and is in communication with the body 24 to receive spice 26 therefrom through the handle front end 20 only when the handle door 25 is in the open orientation thereof (as illustrated in FIG. 2). When the door 25 is in the open orientation and the spoon 10 is oriented with the bowl 14 downwardly, spice 26 from body 24 can pass downwardly, under the influence of gravity, through the open portion of the raceway 32 into receptacle 60.

The bowl transparent cover 62 precludes the spice 26 entering the bowl 14 from passing out of the receptacle 60 through the open top thereof. The cover 62 bears a plurality of visible indicia 66 indicating in convenient terms (for example, $1/8^{th}$ of a teaspoon or one tablespoon) the volumetric level of spice 26 in the bowl 14—i.e., between receptacle 60 and cover 62—when the bowl 14 is vertically oriented downwardly. (While it is generally not required, a level indicator or the like (not shown) may be provided on spoon 10 for indicating to the user that the bowl 14 is vertically oriented downwardly.) The indicia 66 are preferably on the exterior surface of the transparent cover 62 so that they are not worn away by repeated movement of spice 26 thereover, but may be on the interior surface of the transparent cover 62. The user simply orients the spoon 10 vertically, bowl down, and moves the door 25 at front end 20 from its closed orientation into (or at least partially towards) its open orientation, thereby allowing spice 26 to pass from the hollow body 24 through an open portion of raceway 32 into the bowl 14. The spice 26—whether liquid, powdered, or granulated—will then accumulate under the influence of gravity at the lowest portion of the bowl 14, filling the void between the receptacle 60 and the transparent cover 62. When the accumulated spice reaches the level of the appropriate one of indicia 66, the user has only to move the door 25 back to its closed orientation, thereby preventing further passage of spice 26 from the handle 12 into the bowl 14.

The bowl spout 64 is disposed above the indicia 66 (when the bowl 14 is vertically oriented downwardly) and enables passage of spice 26 from the receptacle 60 out of the bowl 14 only when the bowl 14 is appropriately oriented—that is, tilted with the spout 64 oriented downwardly. Thus, the appropriate orientation of the bowl for dispensing spice 26 from the spoon 10 is with the spout side downward. The spout 64 is optionally just an opening in the sidewall of receptacle 60 or cover 62, but preferably includes a floor, outwardly extending from the bowl 14, to guide the spice 26 leaving the bowl 14 into the food (not shown) being prepared.

Referring now in particular to FIGS. 3 and 4, the handle 12 and bowl 14 cooperatively define means for securing the handle 12 and bowl 14 together in a classical spoon configuration. For example, as illustrated, the rearmost portion of the bowl 14 defines a pair of inwardly extending pins or lugs 70 and the foremost portion of the handle 12 defines a pair of recesses 72 configured and dimensioned to receive the lugs 70. The configuration of the rearmost portion of the bowl 14 and the foremost portion of the handle 12 is designed to maintain the orientation of the bowl 14 and handle 12 relative to one another in the same general alignment as the classical spoon, thereby providing the spoon-like configuration characteristic of the present invention. Preferably the engagement of lugs 70 and recesses 72 is releasable so that bowl 14 may be removed from the handle 12 for occasional cleaning without removing the spice 26 from the handle hollow body 24. However, as each spoon 10 (with its handle 12 and bowl 14) is dedicated to a particular spice, frequent cleaning of the bowl 14 is typically not required.

To summarize, the present invention provides a spice storage and dispensing system wherein both the storage and dispensing functions are performed in a single device configured as a spoon, the system being dedicated to a particular spice so that washing of the spoon between uses is minimized. The system is inexpensive, simple and easy to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only the appended claims, and not by the foregoing specification.

I claim:

1. A spice storage and dispensing system configured as a spoon with a bowl, comprising:
   (A) a handle having a front end, a rear end, a hollow body connecting said ends, and a door:
      (a) said body being configured and dimensioned to receive and store spice therein,
      (b) said rear end being manually movable between an open orientation enabling passage of spice into said body and a closed orientation precluding passage of spice out of said body therethrough, and
      (c) said front end providing communication for spice between said body and said bowl;

(d) said door being manually movable between an open orientation enabling passage of spice from said body through said front end into said bowl and a closed orientation precluding passage of spice from said body through said front end into said bowl; and
(B) said bowl having a receptacle, a transparent cover for said receptacle, and a spout:
  (a) said receptacle having an open top and being in communication with said body to receive spice therefrom through said front end only when said door is in said open orientation,
  (b) said transparent cover precluding spice from passing out of said receptacle through said open top thereof and bearing indicia indicating the volumetric level of spice in said bowl when said bowl is vertically oriented downwardly, and
  (c) said spout being disposed above said indicia and enabling passage of spice from said receptacle out of said bowl only when said bowl is appropriately oriented; and
(C) said handle and said bowl cooperatively defining means for securing said handle and said bowl together in a spoon configuration.

2. The system of claim 1 wherein said spout is disposed on one side of said bowl, and the appropriate orientation of said bowl for passage of spice out of said bowl through said spout is with said one side downward.

3. The system of claim 1 wherein said rear end in said open orientation is removed from said body and in said closed orientation is secured to said body.

* * * * *